US005254193A

United States Patent [19]

Carter et al.

[11] Patent Number: 5,254,193

[45] Date of Patent: Oct. 19, 1993

[54] RIBBON ASSEMBLY FIXTURE WITH INTEGRAL INSTRUCTIONS AND METHOD

[75] Inventors: Patrick D. Carter; Bruce S. Jones; Allen W. Putnam, all of Franklin, Tenn.

[73] Assignee: Pelikan, Inc., Franklin, Tenn.

[21] Appl. No.: 690,683

[22] Filed: Apr. 24, 1991

[51] Int. Cl.[5] .............................................. B32B 31/18

[52] U.S. Cl. .................................... 156/157; 156/502; 156/505; 156/506; 400/194; 400/196; 400/196.1; 400/208; 434/219; 434/428; 434/429; 434/430; 242/56 R; 242/56.9; 242/58.1

[58] Field of Search ............... 156/157, 502, 505, 506; 434/219, 428, 429, 430; 400/194, 196, 196.1, 208; 242/56 R, 56.9, 58.1

[56] References Cited

U.S. PATENT DOCUMENTS 756,836 4/1904 De Selms ............................ 434/219
4,390,294 6/1983 Castro .............................. 400/196.1
4,609,422 9/1986 Becking .............................. 156/157
4,632,327 12/1986 Kreeft et al. ......................... 156/506
4,784,408 11/1988 Yasuda ............................... 156/157

*Primary Examiner*—Caleb Weston
*Attorney, Agent, or Firm*—John F. A. Earley; John F. A. Earley, III

[57] ABSTRACT

Assembly fixtures for assembling and stuffing a ribbon into a ribbon cartridge for use with a typewriter, or a printer, comprises a base plate, stops on the base plate forming a space for receiving a ribbon cartridge, and an instruction card mounted on the base plate for instructing the operator how to assemble and stuff a ribbon cartridge. The instruction card may include three-dimensional drawings of the ribbon cartridge and its parts. A method of assembling and stuffing a ribbon cartridge includes the steps of providing an assembly fixture having a base plate and a ribbon cartridge space providing instruction cards mounted on the base plate for instructing an operator, guiding the ribbon cartridge into the cartridge space on the base plate, and following the instructions mounted on the base plate to assemble and stuff the ribbon cartridge.

13 Claims, 3 Drawing Sheets

RIBBON ASSEMBLY FIXTURE WITH INTEGRAL INSTRUCTIONS AND METHOD

BACKGROUND OF THE INVENTION

1. Field of the Invention

This invention relates to assembly fixtures for ribbon cartridges which are used in typewriters and printers, and more particularly concerns assembly fixture apparatus with integral instructions mounted on the fixture for assembling a ribbon cartridge and for stuffing a ribbon into a ribbon cartridge.

2. Description of the Prior Art

Conventional ribbon stuffer machines are available commercially and are used in the production of ribbon cassettes or cartridges. However, these machines must be adaptable and adjustable for stuffing ribbon cassettes of various sizes and shapes. Set-up sheets and assembly instructions are provided for each type and size of cartridge in order to insure good quality and productivity. These set-up and assembly instructions are on sheets of paper and are usually kept in a set-up book, and this book must be found before each set-up. Finding this book takes time, and sometimes it cannot be found at all or the pertinent pages may be missing. Without these instructions, the stuffer machine may be set-up improperly, or the ribbon cartridge may be assembled improperly, which results in a loss of productivity, of quality, of time, and of money.

SUMMARY OF THE INVENTION

An object of the present invention is to provide for rapid set-up of a stuffer machine and its fixture that holds the ribbon cartridge while stuffing it with ribbon so as to minimize down-time and increase efficiency and profits.

It is another object to provide easy means for checking the set-up of the stuffer machine against the correct set-up, and to do so at a glance, so as to insure the accuracy and quality of the set-up.

It is another object of the invention to provide instructions for proper assembly of parts of the ribbon cartridge.

The objects of the invention are accomplished by providing three-dimensional assembly drawings, set-up information, and a parts list, and placing this information on cards that are integrally mounted in clear windows in the fixture itself. Accordingly, set-up sheets and assembly instructions cannot be lost and are not hard to find. These cards provide for quick, at-a-glance, set-up instructions which are easily checked to assure quality of the set-up, and provide for proper assembly of the correct parts because they show part numbers and three-dimensional drawings of the parts, and also show three dimensional drawings of the parts assembled in the ribbon cartridge.

BRIEF DESCRIPTION OF THE DRAWINGS

FIG. 1, left side, is a view in three dimensions of a visual instruction card which shows how a print ribbon should be threaded through the left-hand or exit end of a ribbon cartridge;

FIG. 1, center, is a view in three dimensions of all of the elements of the ribbon cartridge which must be available for assembly into the cartridge. The card shown has a three dimensional drawing of each element, describes each element, and indicates its part number;

FIG. 1, right side, is a view in top plan of a card showing the right-hand or driver end of the ribbon cartridge with the elements of the cartridge correctly placed and positioned in the cartridge;

DETAILED DESCRIPTION OF THE DRAWINGS

Figure 1:
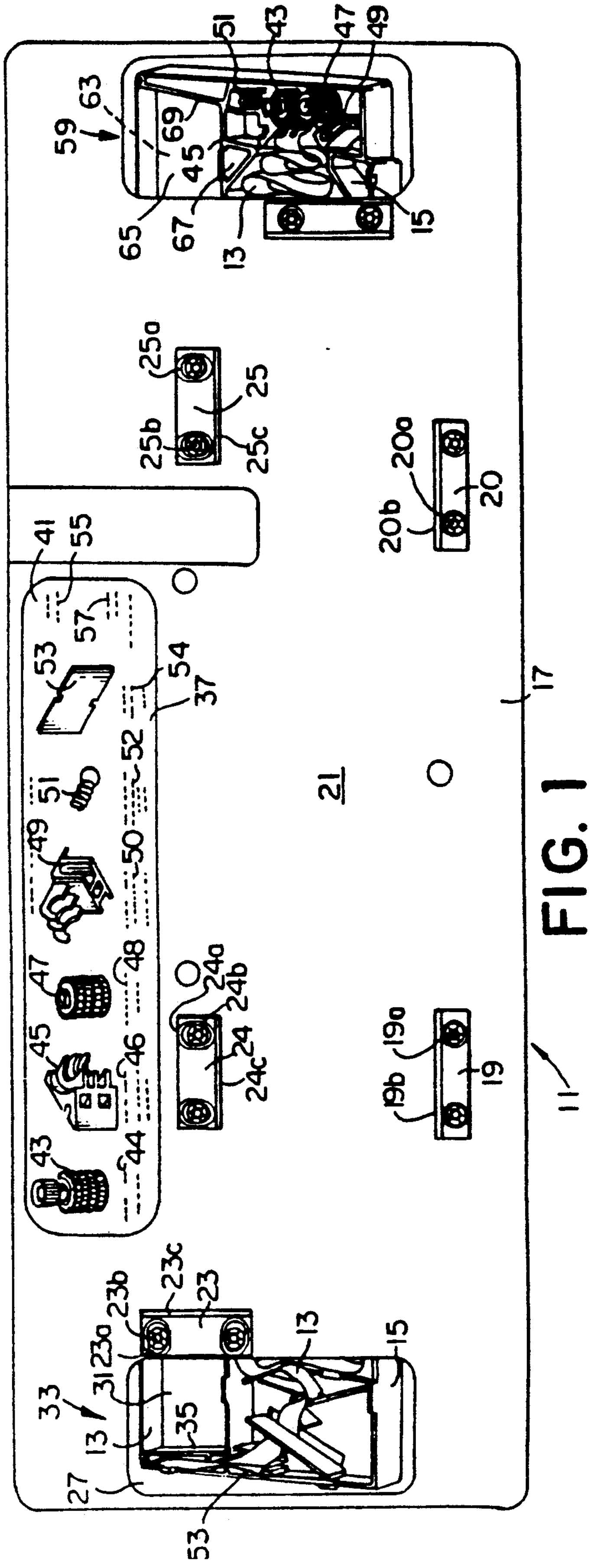
FIG. 1 is a view in top plan of an assembly fixture with integral instructions for assembling a ribbon cartridge, constructed in accordance with this invention.

Turning now to FIG. 1 of the drawings, there is shown a ribbon assembly fixture 11 for threading a print ribbon 13 into a ribbon cartridge, or cassette, case 15, for assembling the various elements or parts of the ribbon cartridge into their proper position in the cartridge case 15, and for stuffing the cartridge with ribbon.

The ribbon assembly fixture 11 includes a base plate 17 and stop means on the base plate 17 positioned so as to receive and properly position a ribbon cassette which is to be assembled and stuffed with ribbon. The stop means comprises two bottom stop blocks 19, 20 which are mounted onto base plate 17 by bolts **19*a* and 20*a* that fix stop blocks 19 and 20** in position.

Blocks 19 and 20 are provided with bevel portions **19*b* and 20*b* which make it easier to slide the ribbon cartridge into the assembly space 21** where the case or bottom housing of the cartridge is positioned for the assembly and stuffing operation.

Three other stop blocks 23, 24, 25 are provided to contact the upper portion of the ribbon cartridge case and these stop blocks 23–25 have slots **23*a*, 24*a*, and 25*a* which provide for adjusting the position of the stop blocks 23–25 that are mounted onto base plate 17 by bolts 23*b*, 24*b*and 25*b*. Stop blocks 23–25 too have beveled edges 23*c*, 24*c* and 25*c* so that the cartridge case may be inserted into assembly space 21** more easily.

FIG. 1, left side, shows an instruction card 27 and its which is in three dimensions. Card 27 is seated in a recess in base plate 17 and is covered by a clear plastic cover 31, which is a sheet of clear plastic, to form a window 33. The card 27 shows how the ribbon 13 is threaded through the left-hand or exit end of the cartridge and through the exit arm 35.

FIG. 1, center, shows a drawing sheet or card 37 mounted in a recess or depression in base plate 17 and covered by a cover 41 which is made of clear synthetic plastic. The top surface of the cover 41 is no higher than flush with the top surface of the base plate 17 so as to not interfere with the assembly operation.

Similarly, the cover 31 of window 33 is no higher than flush with the top surface of the base plate 17 so as to not interfere with the assembly operation.

Turning now again to FIG. 1, center, the card shows three-dimensional drawings of a drive wheel 43 and gives its part number 44. The card 37 also shows three-dimensional drawings of a drive wheel stripper 45 which strips the ribbon off the drive wheel so that it does not become stuck there and allows it to pass into the stuffer box of the ribbon cartridge. The card 37 also shows the part number 46 of the drive wheel stripper.

Card 37 next shows a three-dimensional drawing of a press wheel 47 which presses against drive wheel 43 to pinch the ribbon 13 between the wheels 43 and 47 which are rotated to move the ribbon into the stuffer box of the cartridge case 15. The card 37 also gives the press wheel part number 48.

Next on card 37 is a three-dimensional drawing of a press wheel stripper 49 and its part number 50. Stripper 49 peels the ribbon off the press wheel 47 so that the ribbon does not get stuck there.

Next is a three-dimensional drawing of a compression spring 51, and below it appears its description and its part number 52.

Next is a three-dimensional drawing of brake spring 53, with its description and its part number 54 appearing below it.

Card 37 also shows the part number 55 of the cartridge case and the part number 57 of its cover.

Compression spring 51 presses the drive wheel 43 against the press wheel 47.

FIG. 1, right side, shows a window 59 having a recess in base plate 17 in which is seated a card 63 with a clear cover 65 which is no higher than the top surface of the base plate 17.

Card 63 shows a three-dimensional drawing of the right-hand or driver end 67 of ribbon cartridge case 15 and includes driver arm 69. Card 63 shows the positions of spring 51, drive wheel 43, press wheel 47, drive wheel stripper 45, and press wheel stripper 49.

Brake spring 53 is shown in FIG. 1, left side, mounted in the exit arm 35 of cartridge case 15.

The instruction sheets or cards 27, 37, and 63 are mounted on portions of the base plate 17 which are outside the edges of the cartridge case 15 when it is seated in assembly space 21. The cards are near the outer edges of the base plate 17 so as not to be obscured by the cartridge case 15 or by the assembly operation.

A method of assembling a ribbon cassette 15 in accordance with the invention comprises the steps of providing an assembly fixture 11 including a base plate 17, and stop blocks 19-20, 23-25 mounted on the base plate 17 for receiving and properly positioning a ribbon cartridge case in assembly space 21, and integral assembly instruction cards 27, 37, and 63 for instructing an assembly operator how to assemble parts of the ribbon cartridge case 15. The operator places the case 15 of the cartridge on the base plate 17 by guiding the cartridge case 15 into assembly space 21 between the stop blocks 19-20, 22-25, and follows the instructions on the cards 27, 47, 63 to place the various elements of the cartridge into correct positions in the cartridge case.

Then the operator follows the instructions on the cards 27, 37, 63 to train the ribbon 13 around the elements of the cartridge case.

Lastly, the operator presses a cover onto the cartridge case, and drive wheel 43 is rotated to stuff the ribbon into the cartridge.

Figures 2, 2A:
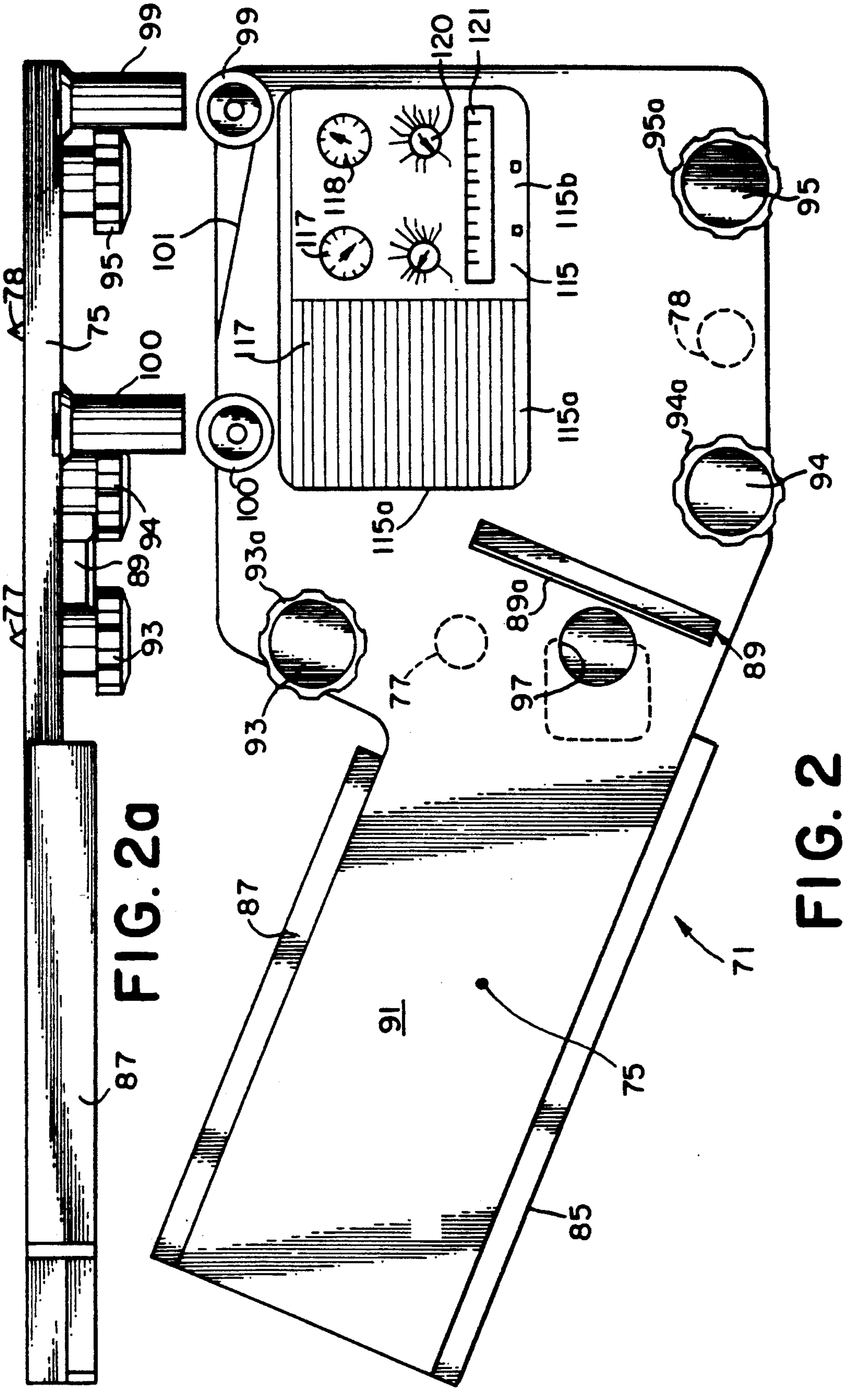
FIG. 2 is a view in top plan of a stuffer fixture adapted for use with a stuffer machine to stuff ribbon into a ribbon cartridge. The fixture has a card mounted in the fixture which shows the information for proper set-up of the stuffer machine.
FIG. 2*a* is a view in elevation of the side wall of the cartridge looking down at the top of the ribbon cartridge shown in FIG. 2.
Figure 3:
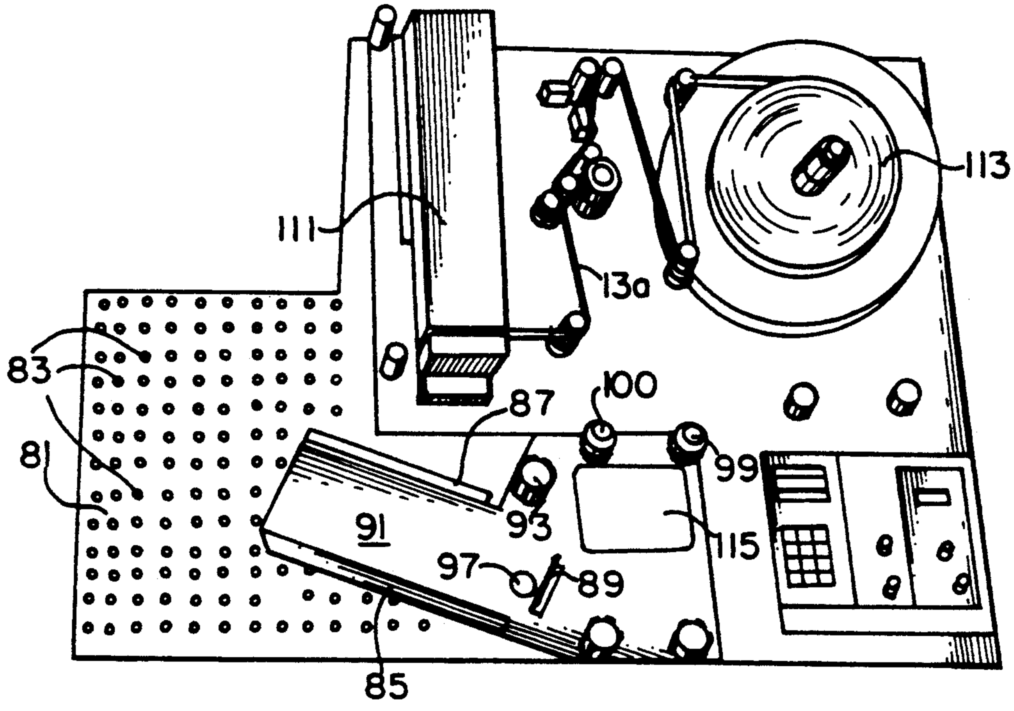
FIG. 3 is a view in top plan of the ribbon stuffer fixture mounted on a stuffer machine.
Figure 4:
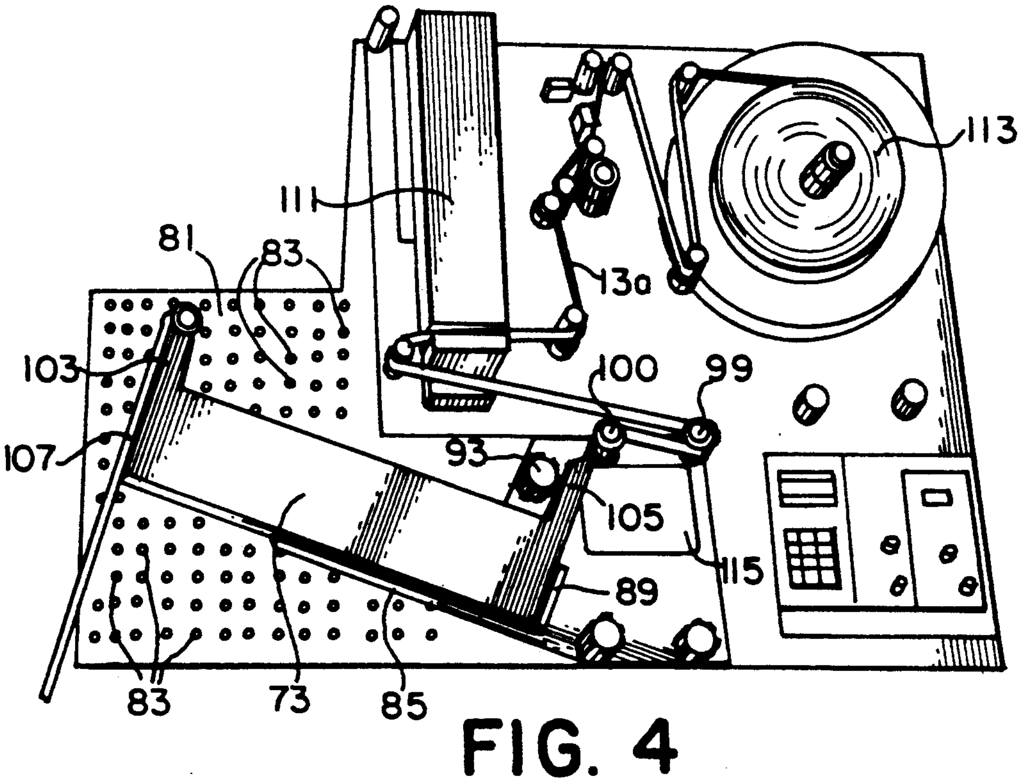
FIG. 4 is a view in top plan of the stuffer machine with a ribbon cassette in place in the assembly space on the ribbon stuffer fixture.

Turning now to FIGS. 2-4, there is shown a stuffing fixture 71 which is useful in stuffing ribbon 13a into a ribbon cassette or cartridge 73 which may be used in a typewriter or in a printer.

Assembly fixture 71 includes a base plate 75 with locator pins 77, 78 that extend from its bottom surface, and are adapted to be seated in locator, holes formed in a universal main bottom plate 81 (FIG. 3) Plate 81 (FIG. 3) has a plurality of holes 83 that are spaced apart uniformly to form a grid.

Fixture base plate 75 has mounted thereon a bottom support bar 85 and a top support bar 87 which are connected to base plate 75 by spring plungers.

An end stop block or locator bar 89 is mounted on base plate 75 and is adapted to contact the drive end arm of a ribbon cartridge 73 (FIG. 4). Stop block 89 is provided with a bevel 89a to make it easier to insert the ribbon cassette 73 into the stuffer space 91 formed on base plate 75 by bottom support bar 85, top support bar 87, and stop block 89.

Ribbon cartridge 73 is a conventional ribbon cartridge having a stuffing box, where the ribbon is stored, a drive wheel, and a press wheel for pressing the ribbon against the drive wheel to move the ribbon into the stuffing box easily.

Assembly fixture 71 is also provided with clamps 93, 94, 95 for clamping the fixture base plate 75 to the main bottom plate 81, and this clamping is accomplished by screwing the clamps 93-94, which have threaded shafts, into threaded holes in the main bottom plate 81. To make turning of the clamps 93-95 easier, they are provided with fluted knobs 93a, 94a, and 95a.

A hole 97 is formed in fixture base plate 75 for admitting the shaft of a driver bit that fits into the drive wheel of the ribbon cartridge to rotate the drive wheel and draw the ribbon 13a into the ribbon cartridge 73 and into its stuffing box.

An idler roller 99 is mounted on the upper right corner of fixture base plate 75, and another idler roller 100 is mounted on fixture base plate 75 a short distance to the left of idler roller 99. A red line 101 is formed in the top surface of base plate 75 between rollers 99 and 100 to show the operator where the ribbon should be threaded, under roller 99 and over roller 100. The ribbon then goes downwardly toward the driver arm of the cartridge.

In operation, the method of stuffing a ribbon cassette 73 with print ribbon 13a comprises the steps of taking assembly fixture 71 having locator pins 77, 78 extending from its bottom surface, setting these base plate locator pins 77, 78 into locator holes in the universal main bottom plate 81, and clamping fixture base plate 75 to the main bottom plate 81 by screwing the threaded clamps 93-95 into threaded holes in the main bottom plate 81.

Fixture base plate 75 has a stop block 89 and support bars 85, 87 which are mounted on its upper surface to form a stuffing space 91 which receives the ribbon cartridge 73 that is to be stuffed with ribbon. The ribbon cartridge 73 is of a conventional type having a stuffing box, a drive wheel, a press wheel, a ribbon exit arm, and a drive side arm.

The ribbon cartridge 73 is inserted into the stuffing space 91 formed by the stop blocks 85, 87, and 89.

The ribbon cartridge 73 (FIG. 4) has a ribbon exit arm 103 and a ribbon drive side arm 105 with a leader 107 properly positioned inside the cartridge 73 between the drive wheel and the press wheel and around elements of the cartridge. A front end of the leader 107 extends from the exit arm 103 of the cartridge 73, and a rear end of the leader 107 extends from the ribbon drive side arm 105 of the cartridge 73.

The operator, after placing the cartridge 73 into the stuffing space 91, takes the rear end of the leader 107 and places it under tack welder 111. Then the operator pulls the front end of the ribbon 13*a* from a reel 113 and transports it to the tack welder 111 and tack welds the front end of the ribbon 13*a* to the rear end of the leader 107.

The operator inserts a driver bit into the drive wheel and rotates the drive wheel to pull the ribbon 13*a* from the reel 113 and stuff it into the stuffing box of the ribbon cartridge 73. When the stuffing box is fully stuffed with the ribbon 13*a*, the operator pulls the front end of the leader 107 out of the cartridge through the exit arm 103 and cuts the leader 107 off the ribbon 13*a*. The rear end of the ribbon 13*a* is then cut to separate the ribbon 13*a* from the reel 113. Thereafter, the two ends of the ribbon 13*a* are welded together to form an endless loop.

Turning now more particularly to FIG. 2, there is shown an instruction card 115 which is seated in a depression in the top surface of the base plate 75 and is covered by a clear plastic cover 117 which rises no higher than the top surface of the base plate 75 so as to not interfere with the stuffing operation.

The card 115 contains set-up information for the operator and is entitled "Stuffing Application Information Card".

Reading down the list on the left-hand side 115*a* of the card, the first line shows the word "APPLICATION". In practice, the serial number of the ribbon cassette is inserted into the blank space after the word "APPLICATION".

The fourth line gives the assembly drawing number which is "149-582083" in case the operator wishes to refer to the assembly drawing for some reason.

The fifth line gives the model number of the stuffer machine as being No. 5000.

The sixth line gives the serial numbers of the two stuffer machines which are used alternately by the operator. These stuffer machines are placed at 90° from each other so that it is easy for the operator to tend to both stuffer machines.

The seventh and eighth lines recite "DEPARTMENT" and "LOCATION" and the answer listed is "REM" which is the name of the manufacturer of the stuffing machine that this fixture 71 is used with.

The ninth line says "CARTRIDGE TYPE" and indicates that the cartridge type is number 146.

The tenth line indicates that the "RIBBON WIDTH" is $\frac{3}{8}$ inches wide and 5 mils thick.

The eleventh line indicates the "LOAD RPM" is 1800 revolutions per minute for the driver bit that rotates the drive wheel of the ribbon cassette.

The thirteenth line tells the operator that the "DRIVE BIT" is 0.250 inches in diameter and the type of the drive is a cross bit, rather than a star bit, for example.

The fourteenth line says the "DRIVE BIT ROTATION" is counterclockwise, and the fifteenth line says that the "LOAD LENGTH", the length of the ribbon to be loaded into the cassette, is 300 feet.

The seventeenth line says the "DRIVE POSITION", the length of the shaft of the driver bit, is three inches. It is this long so as to penetrate through the main base plate 81 and through the fixture base plate 75 and into the cassette to mesh with the drive wheel and rotate it.

The right-hand portion 115*b* of the instruction card 115 shows a number of facsimile drawings of dials 117–121 which are a facsimile or duplicate of the actual dials which are mounted on the stuffer machine. The facsimile dials 117–121 on the information card 115 show the positions that the machine dials should be brought to upon being set-up. For example, the "CARTRIDGE DRIVE REFRIGERATION PRESSURE" should be 100 psi as shown on facsimile dial 117. This is the pressure of a cold air stream which is directed at the drive wheel that is rotated at such high speeds that it would become hot and melt if it were not cooled by the cold stream of air directed toward it. The "SYSTEM OPERATING PRESSURE" is indicated by facsimile dial 118 as being 60 psi and this is the pressure at which the operator is instructed to operate the stuffer machine. Facsimile dial 118 tells the operator to make sure that the actual dial on the stuffer machine is pointed to 60.

The "WELD TIME" is indicated on facsimile dial 119, and is the time that the welding machine is turned on. The "HOLD TIME" after welding is indicated on facsimile dial 120, and tells the operator that the ribbon should remain in the welder for a certain period of time after the weld has been made. The operator is also instructed by the card that the "CARTRIDGE DRIVE REFRIGERATION" should be on.

We claim:

1. An assembly fixture for assembling parts of a ribbon cartridge into a ribbon cartridge case, said ribbon cartridge being for use with a typewriter, or printer, comprising a base plate having a top surface and outside edges, stop means on the base plate for receiving and properly positioning and holding a case of a ribbon cartridge in an assembly space for assembling parts of a ribbon cartridge into the case, and instruction means mounted on the base plate showing parts of the ribbon cartridge for instructing an assembly operator how to assemble the parts of the cartridge in the case and how to thread a ribbon around the parts in the case.

2. The assembly fixture of claim 1, said instruction means including three-dimensional drawings showing the parts of the ribbon cartridge in unassembled condition and also showing the parts of the ribbon cartridge in assembled condition.

3. The assembly fixture of claim 1, said instruction means including a sheet of drawings of the cartridge case showing the parts of the cartridge, showing the position of the parts in the case, and showing the position of the ribbon in the case.

4. The assembly fixture of claim 3, said base plate having depressions in the top surface which receive and seat the sheet of drawings.

5. The assembly fixture of claim 4, including a clear cover sheet made of synthetic plastic and mounted over the drawing sheet with the top surface of the cover sheet being no higher than flush with the top of the surface of the base plate so as to not interfere with the assembly operation.

6. The assembly fixture of claim 5, the drawing sheet being mounted on a portion of the base plate which is outside the assembly space and is near the edges of the base plate so that the sheet of drawings is not obscured by the case or by the assembly operation.

7. A method of assembling parts of a ribbon cartridge into a ribbon cartridge case, comprising the steps of providing an assembly fixture including a base plate, stop means on the base plate forming an assembly space for receiving and properly positioning and holding a case of a ribbon cartridge, and instruction means mounted on the base plate for instructing an assembly operator how to assemble parts of the ribbon cartridge into the case and how to thread a ribbon around the parts in the case and through the case, guiding the case of a ribbon cartridge into proper position on the base plate in the assembly space, glancing at the instruction means to quickly and reliably receive the instructions, following the instructions mounted on the base plate to place the parts of the ribbon cartridge into the case in their correct positions, glancing at the instruction means and following the instructions mounted on the base plate to thread a ribbon around the parts of the case, and pressing a cover onto the case.

8. A method of stuffing a ribbon into a ribbon cartridge, comprising taking a stuffing fixture with a base plate having a stuffing space formed thereon for receiving a ribbon cartridge which is to be stuffed with ribbon, said ribbon cartridge having a stuffing box, a ribbon exit arm, a drive side arm, a drive wheel, and a leader which has a front end and a rear end and is threaded through the cartridge with the front end of the leader extending from the exit arm and the rear of the leader extending from the drive side arm, said stuffing fixture having an instruction card mounted thereon with set-up instructions, mounting the stuffing fixture on a universal bottom plate of the stuffer machine, setting up the stuffer machine by following the information on the card mounted on the fixture, inserting said ribbon cartridge into the stuffing space on the stuffing fixture, pulling the rear end of the leader to a tack welder, pulling a front end of a ribbon from a reel to the tack welder, tack welding the front end of the ribbon to the rear end of the leader, rotating the drive wheel of the cartridge to stuff the ribbon into the stuffing box, pulling the front end of the leader to pull the leader out of the cartridge after the cartridge has been stuffed with ribbon, cutting the front end of the ribbon to separate the leader from the ribbon, cutting the rear end of the ribbon to separate it from the reel, and welding the front and rear ends of the ribbon together to make a continuous loop of ribbon.

9. In a stuffer machine for stuffing a ribbon into a ribbon cartridge for use with a typewriter, or printer, a stuffer fixture comprising a base plate having a top surface, stop means mounted on the base plate defining a stuffing space for receiving a ribbon cartridge which is to be stuffed with ribbon, said ribbon cartridge having a stuffing box, a ribbon exit arm, a drive side arm, a drive wheel, and a leader, having a front end, and rear end threaded through the cartridge with the front end of the leader extending from the exit arm and the rear end of the leader extending from the drive side arm, and instruction means mounted on the base plate for giving information to an operator as to how to set up the stuffer machine to stuff ribbon into the cartridge, said instruction means including an information sheet showing stuffer machine parameters and showing facsimile dials which show the correct position of the actual dials on the stuffer machine at start up of the stuffing operation.

10. The stuffer fixture of claim 9, said base plate having depressions in its top surface which receive and seat the information sheet, a clear cover made of synthetic plastic mounted over the information sheet with the cover having a top surface no higher than flush with the top surface of the base plate so as to not interfere with the stuffing operation, said information sheet being mounted on a portion of the base plate which is outside the stuffing space and is near the edges of the base plate so as to not be obscured by the cartridge case or by the stuffing operation.

11. In a stuffer machine for stuffing a ribbon into a ribbon cartridge, for use with a typewriter, or printer, a stuffer fixture comprising a base plate having a bottom surface, locator pins extending from the bottom surface and having a stop block and support bars defining a stuffing space for receiving a ribbon cartridge which is to be stuffed with ribbon, an instruction card mounted on the base plate with set-up information and set-up facsimile dials which show the correct position of actual dials on a stuffer machine at start-up of the stuffing operation, said ribbon cartridge having a stuffing box, a ribbon exit arm, a drive side arm, drive wheel, and a leader, which has a front end and a rear end, threaded through the cartridge with the front end of the leader extending from the exit arm and the rear end of the leader extending from the drive side arm, locator holes in a universal bottom plate having a plurality of holes which are spaced apart uniformly to form a grid, said locator holes being adapted to receive the base plate locator pins, and clamping means mounted on the base plate for clamping the base plate to the bottom plate.

12. In a stuffer machine for stuffing a ribbon into a ribbon cartridge for use with a typewriter, or printer, the invention comprising a stuffing fixture with a base plate having a stuffing space formed thereon for receiving a ribbon cartridge which is to be stuffed with ribbon, locator pins extending from the bottom surface of the base plate, said ribbon cartridge having a stuffing box, a ribbon exit arm, a drive side arm, a drive wheel, and a leader which has a front end and a rear end and is threaded through the cartridge with the front end of the leader extending from the exit arm and the rear end of the leader extending from the drive side arm, an instruction card mounted on the base plate with set-up information, a universal bottom plate having locator holes adapted to receive the locator pins of the base plate, and a tack welder for tack welding the rear end of the leader to the front end of the ribbon mounted on a reel.

13. A method of stuffing a ribbon into a ribbon cartridge, comprising taking a stuffing fixture with base plate having a bottom surface with locator pins extending from the bottom surface of the base plate and having a stop block and support bars defining a stuffing space for receiving a ribbon cartridge which is to be stuffed with ribbon, said stuffing fixture having an instruction card mounted theron with set-up information and set-up facsimile dials which show the correct position of actual dials on a stuffer machine at start-up of the stuffing operation, said ribbon cartridge having a stuffing box, a ribbon exit arm, a drive side arm, a drive wheel, and a leader which has a front end and a rear end and is threaded through the cartridge with the front end of the leader extending from the exit arm and the rear end of the leader extending from the drive side arm, setting the base plate locator pins in locator holes in a universal bottom plate having a plurality of holes which are spaced apart uniformly to form a grid, clamping the base plate to the bottom plate, setting up the stuffer machine in accordance with the instructions on the card, adjusting the dials on the stuffer machine to show the same quantities as shown on the facsimile dials on the instruction card, inserting said ribbon cartridge into the stuffing space, pulling the rear end of the leader to a tack welder, pulling a front end of a ribbon from a reel to the tack welder, tack welding the front end of the ribbon to the rear end of the leader, rotating the drive wheel of the cartridge to stuff ribbon into the stuffing box until the stuffing box is full, pulling the front end of the leader to pull the leader completely out of the cartridge, cutting the front end of the ribbon to separate the leader from the ribbon, cutting the rear end of the ribbon to separate it from the reel, and welding the front and rear ends of the ribbon together to make a continuous loop.

* * * * *